(12) United States Patent
Cheng et al.

(10) Patent No.: US 9,377,603 B1
(45) Date of Patent: Jun. 28, 2016

(54) LOW-PROFILE HYBRID LENS SYSTEMS AND METHODS FOR MANUFACTURING THE SAME

(71) Applicant: OmniVision Technologies, Inc., Santa Clara, CA (US)

(72) Inventors: Tingyu Cheng, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/605,472

(22) Filed: Jan. 26, 2015

(51) Int. Cl.
*G02B 3/02* (2006.01)
*G02B 9/14* (2006.01)
*G02B 13/00* (2006.01)

(52) U.S. Cl.
CPC .......... *G02B 13/0085* (2013.01); *G02B 13/006* (2013.01); *G02B 13/0035* (2013.01)

(58) Field of Classification Search
USPC .......... 359/716, 785, 726, 645, 651, 661, 742
See application file for complete search history.

(56) References Cited

U.S. PATENT DOCUMENTS

| | | | | |
|---|---|---|---|---|
| 6,490,102 B1 * | 12/2002 | Huang | ...................... | G02B 9/16 359/645 |
| 7,446,954 B2 * | 11/2008 | Sun | .......................... | G02B 9/34 359/569 |
| 8,964,311 B2 * | 2/2015 | Baba | ..................... | G02B 13/003 359/784 |
| 2006/0152824 A1 * | 7/2006 | Sun | ..................... | G02B 13/0035 359/785 |

* cited by examiner

*Primary Examiner* — Mohammed Hasan
(74) *Attorney, Agent, or Firm* — Lathrop & Gage LLP (57) ABSTRACT

A low-profile hybrid lens system, for imaging a scene onto an image plane, includes (a) a wafer-level lens with (i) a planar substrate having opposing first and second surfaces, (ii) a first lens element of a first material and disposed on the first surface, and (iii) a second lens element of a second material and disposed on the second surface; (b) a first cast lens; and (c) a second cast lens; wherein the wafer-level lens, the first cast lens, and the second cast lens are optically coupled in series. A method for manufacturing a low-profile hybrid lens system includes mounting a wafer-level lens, a first cast lens, and a second cast lens in a fixture to optically couple, in series, the wafer-level lens and the first and second cast lenses.

20 Claims, 9 Drawing Sheets

```
FORM PLURALITY OF FIRST LENS ELEMENTS OF FIRST MATERIAL ON FIRST
SURFACE OF WAFER
710
            │
            ▼
FORM PLURALITY OF SECOND LENS ELEMENTS OF SECOND MATERIAL ON
SECOND SURFACE OF WAFER, OPTIONALLY SECOND MATERIAL IS DIFFERENT
FROM FIRST MATERIAL
720
            │
            ▼
SINGULATE A PLURALITY OF WAFER-LEVEL LENSES FROM THE WAFER
730
```

```
DISPOSE RESIN IN MOLD HAVING SHAPE COMPLIMENTARY TO LENS SHAPE
810
            │
            ▼
HARDEN MATERIAL IN MOLD TO FORM CAST LENS
820
            │
            ▼
RELEASE CAST LENS FROM MOLD
830
```

FIG. 8

LOW-PROFILE HYBRID LENS SYSTEMS AND METHODS FOR MANUFACTURING THE SAME

BACKGROUND

Cameras are incorporated in a wide array of devices. Consumer electronics devices such as mobile phones, tablets, and laptops generally include a compact camera module. The majority of such devices are equipped with a lens system composed of plastic lenses in a fixed configuration. To comply with the steadily decreasing form factor of such devices, the imaging objective of the camera module must have a low profile. For example, a modern camera phone may have a thickness of less than 10 millimeters (mm), including the casing itself. While complying with these challenging form factor requirements, the camera module must provide high-resolution images. This imposes constraints on both the lens system and the image sensor. Typical camera modules have pixel resolution around two megapixels or higher. With such a large number of pixels sharing incident light, the associated lens system must have high light collection efficiency in order to generate a sufficiently bright image. To avoid vignetting, the lens system must generate an image circle that is at least as large as the image sensor. Most image sensors, with pixel resolution of 2 megapixels or higher, have side length of a few millimeters. Thus, an associated lens system must generate an image circle with a diameter that is at least a few millimeters.

SUMMARY

Disclosed herein are low-profile hybrid lens systems that combine a wafer-level lens with one or more cast lenses to generate a large image circle while having a short total track length. These low-profile hybrid lens systems are well-suited for incorporation into compact camera modules used in portable devices such as a mobile phone.

In an embodiment, a low-profile hybrid lens system, for imaging a scene onto an image plane, includes (a) a wafer-level lens with (i) a planar substrate having opposing first and second surfaces, (ii) a first lens element of a first material and disposed on the first surface, and (iii) a second lens element of a second material and disposed on the second surface; (b) a first cast lens; and (c) a second cast lens; wherein the wafer-level lens, the first cast lens, and the second cast lens are optically coupled in series.

In an embodiment, a method for manufacturing a low-profile hybrid lens system includes mounting a wafer-level lens, a first cast lens, and a second cast lens in a fixture to optically couple, in series, the wafer-level lens and the first and second cast lenses, wherein the wafer-level lens includes (a) a planar substrate having opposing first and second surfaces, (b) a first lens element of a first material and disposed on the first surface, and (c) a second lens element of a second material and disposed on the second surface.

DETAILED DESCRIPTION OF THE EMBODIMENTS

Figure 1:
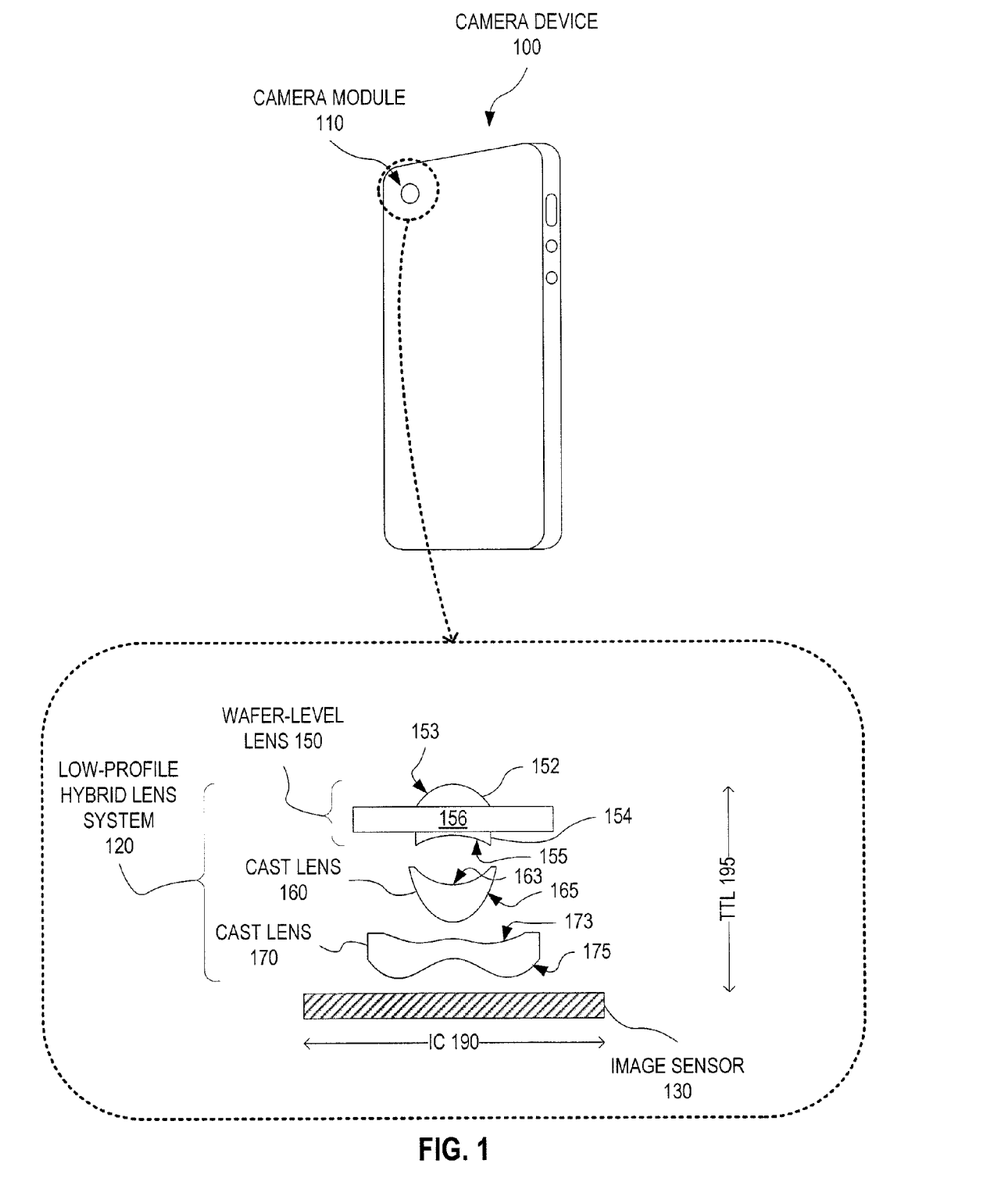
FIG. 1 illustrates a low-profile hybrid lens system implemented in an exemplary camera device, according to an embodiment.

FIG. 1 illustrates one exemplary low-profile hybrid lens system 120 implemented in one exemplary camera device 100. Camera device 100 is, for example, a mobile phone, a tablet, or a laptop. However, camera device 100 may be another type camera device without departing from the scope hereof. Low-profile hybrid lens system 120 is coupled with an image sensor 130 in a camera module 110. Camera module 110 is implemented in camera device 100.

Low-profile hybrid lens system 120 includes a wafer-level lens 150, a cast lens 160, and a cast lens 170. Wafer-level lens 150 and cast lenses 160 and 170 are optically coupled in series to image a scene onto an image plane. In camera module 110, the image plane of low-profile hybrid lens system 120 substantially coincides with image sensor 130. Wafer-level lens 150 includes lens elements 152 and 154 disposed on opposing sides of a substrate 156. Lens element 152 has a lens surface 153 facing away from the image plane of low-profile hybrid lens system 120. Lens element 154 has a lens surface 155 facing toward the image plane of low-profile hybrid lens system 120. Cast lens 160 has lens surfaces 163 and 165 respectively facing away from and toward the image plane of low-profile hybrid lens system 120. Cast lens 170 has lens surfaces 173 and 175 respectively facing away from and toward the image plane of low-profile hybrid lens system 120.

Each of cast lenses 160 and 170 is integrally formed, that is formed from one material and in one piece. Hence, each of cast lenses 160 and 170 is composed of a single material throughout. However, one or both of cast lenses 160 and 170 may include one or more surface coatings, such as an antireflective coating, without departing from the scope hereof. Such a coating is applied to the cast lens subsequent to casting of the lens.

Cast lenses 160 and 170 may be manufactured at very low cost, for example using injection molding techniques. Wafer-level lens 150 benefits from wafer-level mass-production methods to enable even lower manufacturing cost than those associated with cast lenses 160 and 170. Furthermore, wafer-level production of wafer-level lens 150 allows for lens elements 152 and 154 (and also substrate 156) to be made from different materials. Such additional freedom of material choices, as compared to a cast lens, provides additional flexibility to achieve desired performance characteristics of wafer-level lens 150. In an embodiment, lens element 152 is made from a different material than the material of lens element 154. However, not all lens shapes are compatible with wafer-level manufacturing. For example, not all lens shapes are capable of accommodating a planar substrate between the two lens surfaces. Low-profile hybrid lens system 120 includes cast lenses 160 and 170 to achieve certain lens shapes that are incompatible with wafer-level manufacturing, or at least impractical to produce at the wafer level. At least in part by virtue of these lens shapes, cast lenses 160 and 170 cooperate with wafer-level lens 150 to produce a short total track length (TTL) 195 and a large image circle. In FIG. 1, the image circle of low-profile hybrid lens system 120 is represented by the diameter 190 of the image circle (IC). In one embodiment, TTL 195 is less than IC 190. In another embodiment, TTL 195 is comparable to IC 190. Since TTL 195 is relatively short and IC 190 is relatively large, low-profile hybrid lens system 120 and camera module 110 may be made compact. Low-profile hybrid lens system 120 is therefore well-suited for incorporation into embodiments of camera device 100 having a small form factor in one or more dimensions, such as modern mobile phones or tablets.

Herein, "total track length" of a lens system refers to the greatest distance, parallel to the optical axis of the lens system, from the image plane of the lens system to the lens surface farthest from the image plane. The image circle of a lens system is the cross-section of the cone of light transmitted to the image plane by the lens system. Herein, the image circle is defined as the circle that coincides with full width at half maximum of the cone at the image plane. Herein, the "image circle" of a lens system refers to a collection or set of the farthest positions, with respect to the position of the optical axis, that light transmitted by the lens system can reach on the image plane. For axially symmetric lens systems such as those disclosed herein, this collection or set describes a circle on the image plane.

Figure 2:
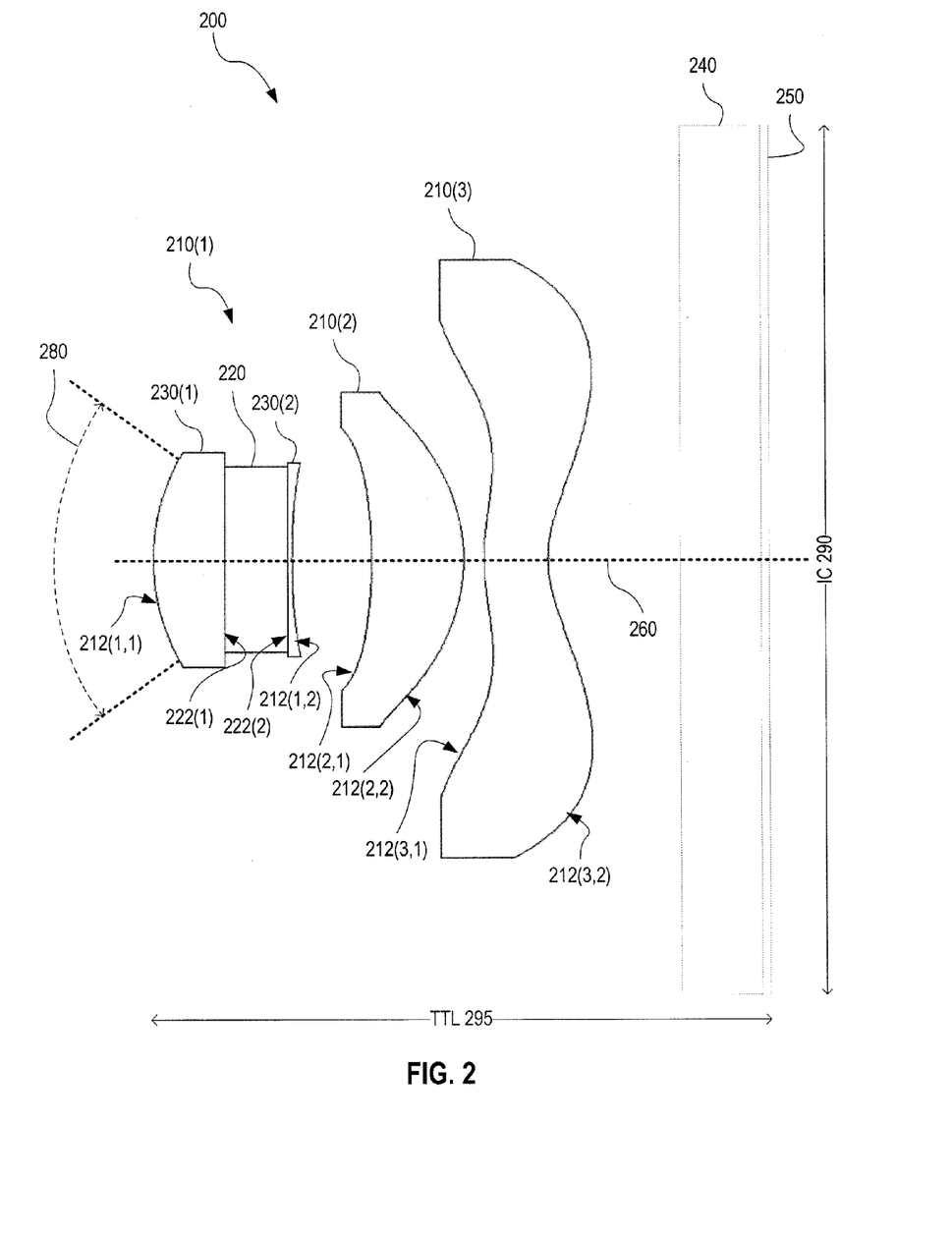
FIG. 2 illustrates one embodiment of the low-profile hybrid lens system of FIG. 1.

FIG. 2 illustrates one exemplary low-profile hybrid lens system 200 that includes a wafer-level lens 210(1), a cast lens 210(2), and a cast lens 210(3) optically coupled in series. Low-profile hybrid lens system 200 illustrates, by non-limiting example, the beneficial concepts discussed in connection with FIG. 1. While particular values of parameters for low-profile hybrid lens system 200 are disclosed, actual values may deviate from the disclosed values. A disclosed parameter value is a particular example of a range values and may be extended to such a range of values. Low-profile hybrid lens system 200 is an embodiment of low-profile hybrid lens system 120. Wafer-level lens 210(1) is an embodiment of wafer-level lens 150. Cast lenses 210(2) and 210(3) are embodiments of cast lenses 160 and 170, respectively.

Low-profile hybrid lens system 200 is configured to image a scene onto an image plane 250 with a cover glass 240 placed between low-profile hybrid lens system 200 and image plane 250. Cover glass 240 is, for example, made of glass, plastic, or a combination thereof. Low-profile hybrid lens system 200 has a total track length 295 and forms an image circle 290 on image plane 250. Low-profile hybrid lens system 200 has a field of view (FOV) indicated by FOV angle 280. FIG. 2 further indicates the optical axis 260 of low-profile hybrid lens system 200.

Wafer-level lens 210(1) includes lens elements 230(1) and 230(2), and a substrate 220. Lens elements 230(1) and 230(2) are embodiments of lens elements 152 and 154, respectively. Substrate 220 is an embodiment of substrate 156. Substrate 220 has a substantially planar surface 222(1), facing away from image plane 250, and a substantially planar surface 222(2) facing toward image plane 250. Lens elements 230(1) and 230(2) are disposed on surfaces 222(1) and 222(2), respectively. Lens element 230(1) has a convex lens surface 212(1,1) facing away from image plane 250. Lens element 230(2) has a concave lens surface 212(1,2) facing toward image plane 250. Cast lens 210(2) has a concave lens surface 212(2,1) and a convex lens surface 212(2,2) respectively facing away from and toward image plane 250. Cast lens 210(3) has lens surfaces 212(3,1) and 212(3,2) respectively facing away from and toward image plane 250. Cast lens 210(3) is gull-wing shaped, and each of lens surfaces 212(3,1) and 212(3,2) include both convex and concave portions. All of lens surfaces 212 are aspheric.

Surface 222(1) defines an aperture stop of low-profile hybrid lens system 200. Without departing from the scope hereof, the diameter of substrate 220(1) may be larger than shown in FIG. 2, in which case an aperture may be disposed on surface 222(1) to form the aperture stop. Also without departing from the scope hereof, lens elements 230(1) and 230(2), and cast lenses 210(2) and 210(3) may have larger diameters than illustrated in FIG. 2, although the optical performance presented below assumes optically active areas as illustrated in FIG. 2.

Convex lens surface 212(1,1) collects incident rays and directs those rays into low-profile hybrid lens system 200. The convex-planar shape of lens element 230(1) mitigates angles of rays entering low-profile hybrid lens system 200 and guides these rays through the stop aperture. Lens element 230(2) corrects chromatic aberration of low-profile hybrid lens system 200. Cast lens 210(2) directs the bundle of rays received from wafer-level lens 210(1) toward cast lens 210(3). Cast lens 210(2) is shaped to maintain, at least to a certain degree, the symmetry of each ray bundle respectively associated with a field location, such that the angular spread of a ray bundle before wafer-level lens 210(1) is similar to the angular spread of the corresponding ray bundle after cast lens 210(2). As a result, TTL 295 is shorter than what would be achieved with less symmetric lens systems. Cast lens 210(3) primarily serves to (a) correct aberrations, especially distortion and astigmatism, and (b) direct the bundles of rays to image plane 250.

Tables 1A and 1B lists the lens data of low-profile hybrid lens system 200. The lens data includes values of design parameters for all lens surfaces 212, lens elements 230(1) and 230(2), substrate 220, and cast lenses 210(2) and 210(3). The lens data also includes the aperture stop (STO) location, configuration of cover glass (CG) 240, and a gap between cover glass 240 and image plane (IMA) 250. In addition, an assumed object location (OBJ) is listed. Material properties and thicknesses of each of lens elements 230(1) and 230(2), substrate 220, cast lenses 210(2) and 210(3), and cover glass 240 are indicated in Table 1A in the same row as the first surface of the respective element, as viewed from the object side. Material properties indicated in Table 1A are (a) the index of refraction $n_D$ at the Fraunhofer D-line $\lambda_D$=589.3, and (b) the Abbe number. The Abbe number is a measure of optical dispersion in a material and is defined as $V_d=(n_D-1)/(n_F-n_C)$, where $n_F$ and $n_C$ are the indices of refraction at the Fraunhofer F-line $\lambda_F$=486.1 nm and the Fraunhofer C-line $\lambda_C$=656.3 nm, respectively.

Table 1B lists the aspheric coefficients of each lens surface 212. For each lens surface 212, the surface profile can be expressed as $$Z(s) = \frac{Cs^1}{1+\sqrt{1-(1+k)C^2s^2}} + A_4 s^4 + A_6 s^6 + \ldots,$$

where Z is the surface sag parallel to optical axis 260 as a function of the radial distance s from optical axis 260, C is the inverse of the radius of curvature, k is the conic constant, and $A_4, A_6, \ldots$ are the $4^{th}, 6^{th}, \ldots$ order aspheric terms.

Low-profile hybrid lens system 200 has a working F-number of 2.53, a FOV angle 280 of 80.2 degrees, TTL 295 of 2.803 mm, and IC 290 of 3.692 mm. It follows that IC/TTL=1.317 for low-profile hybrid lens system 200.

As evident from Table 1A, lens elements 230(1) and 230(2) are made from two different materials. The material of lens element 230(1) has index of refraction $n_D$=1.51 and Abbe number $V_d$=57.00, while lens element 230(2) has index of refraction $n_D$=1.59 and Abbe number $V_d$=31.24. The Abbe number of lens element 230(2) is smaller than both the Abbe number of lens element 230(1) and the Abbe number of cast lens 210(2).

The *Handbook of Plastic Optics* (Wiley-VCH, publisher) lists examples of transparent optical materials with Abbe number greater than 55. These include polymethyl methacrylate (PMMA), and cycloolefin polymers such as APEL™ 5014DP, TOPAS® 5013, and ZEONEX® 480R. The lens materials with Abbe number greater than 55 may be plastic, glass, or any other optical material without deviating from the scope hereof. The *Handbook of Plastic Optics* further lists examples of transparent optical materials with Abbe number less than 35. These include polycarbonate such as PANLITE®, polysulfone such as Udel® P-1700, and optical polyester such as OKP-4. The lens materials with Abbe number less than 35 may be plastic, glass, or any optical material without deviating from the scope hereof.

The projected locations of lens surfaces 212(2,1) and 212(2,2) of cast lens 210(2) onto optical axis 260 are separated by about 50 microns. As a result, it would not be practical to produce cast lens 210(2) at the wafer-level (in a manner similar to wafer-level lens 210(1)) instead of by casting, since the substrate of such a wafer-level lens would need to have thickness less than 50 microns. Similarly, the projected locations of lens surfaces 212(3,1) and 212(3,2) of cast lens 210(3) onto optical axis 260 are separated by about 100 microns, and it would not be practical to produce cast lens 210(3) at the wafer-level instead of by casting.

The radii of curvature of lens surfaces 212 are such that (R2/R5)*R6<1.85 mm, and R5/R3/R2/R4/R1≥0.15 mm$^{-3}$, wherein R1, R2, R3, R4, R5, and R6 are the radii of curvature for lens surfaces 212(1,1), 212(1,2), 212(2,1), 212(2,2), 212(3,1), and 212(3,2), respectively.

TABLE 1A

| Surface | Radius of curvature [mm] | Thickness [mm] | $n_D$ | $V_d$ | Diameter [mm] |
|---|---|---|---|---|---|
| OBJ | Infinity | 400.000 | | | 674.417 |
| 212(1,1) | 1.022 | 0.347 | 1.51 | 57.00 | 1.043 |
| 222(1)/STO | Infinity | 0.305 | 1.52 | 62.60 | 0.754 |
| 222(2) | Infinity | 0.020 | 1.59 | 31.24 | 0.900 |
| 212(1,2) | 3.256 | 0.386 | | | 0.941 |
| 212(2,1) | −2.200 | 0.445 | 1.51 | 57.00 | 1.280 |
| 212(2,2) | −0.886 | 0.098 | | | 1.627 |
| 212(3,1) | 1.034 | 0.310 | 1.52 | 49.80 | 2.336 |
| 212(3,2) | 0.569 | 0.452 | | | 2.907 |
| CG | Infinity | 0.400 | 1.52 | 62.60 | 3.406 |
| Gap | Infinity | 0.040 | | | 3.642 |
| IMA 250 | Infinity | | | | 3.692 |

TABLE 1B

| | Aspheric coefficient | | | | | | |
|---|---|---|---|---|---|---|---|
| Surface | k | $A_4$ | $A_6$ | $A_8$ | $A_{10}$ | $A_{12}$ | $A_{14}$ |
| 212(1,1) | −0.7835 | 0.0623 | 0.3111 | −1.1128 | 4.5303 | −8.7711 | |
| 212(1,2) | 29.8069 | 0.0940 | −0.7708 | 1.4127 | −0.2192 | −6.0141 | |
| 212(2,1) | −82.5283 | −0.5920 | 1.6459 | −7.9125 | 15.3144 | −8.6935 | −13.4633 |
| 212(2,2) | −1.3555 | −0.2663 | 0.6263 | −1.7680 | 1.2897 | 0.5254 | 0.2030 |
| 212(3,1) | −16.3612 | −0.6013 | 0.1038 | 0.3016 | −0.1456 | −0.0055 | 0.0095 |
| 212(3,2) | −4.4068 | −0.3175 | 0.2076 | −0.0935 | 0.0081 | 0.0027 | −0.0004 |

FIGS. 3A, 3B, 3C, and 3D show the optical performance of low-profile hybrid lens system 200 (FIG. 2), as evaluated by the Zemax® Optical Design Program. FIGS. 3A, 3B, 3C, and 3D show spherical aberration, f-theta distortion, field curvature, and lateral color, respectively, of low-profile hybrid lens system 200, assuming location of object (OBJ) and image plane (IMA) 250 as indicated in Table 1A. As demonstrated by FIGS. 3A, 3B, 3C, and 3D, low-profile hybrid lens system 200 produces an image on image plane 250 of high optical quality.

Figure 3A:
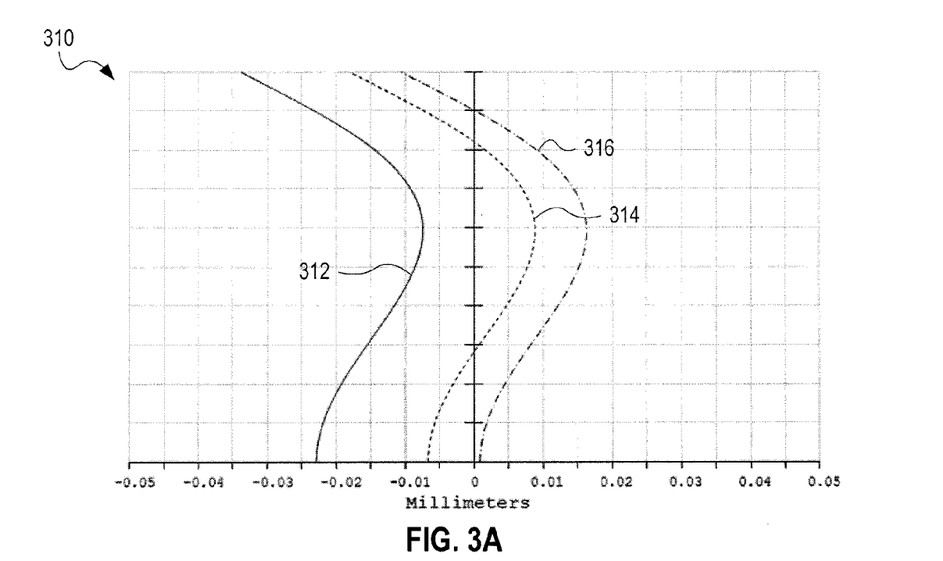
FIG. 3A is a plot of the longitudinal spherical aberration of the low-profile hybrid lens system of FIG. 2.

FIG. 3A is a plot of the longitudinal spherical aberration of low-profile hybrid lens system 200. FIG. 3A shows the longitudinal spherical aberration in millimeters, displayed on the horizontal axis, as a function of entrance pupil height, displayed on the vertical axis. The vertical axis extends from optical axis 260 to the most extreme radial distance from optical axis 260 associated with FOV angle 280. The maximum entrance pupil radius is $r_p$=0.4261 mm. Longitudinal spherical aberration curves 312, 314, and 316 are computed at the Fraunhofer F-, D- and C-lines, respectively.

Figure 3B:
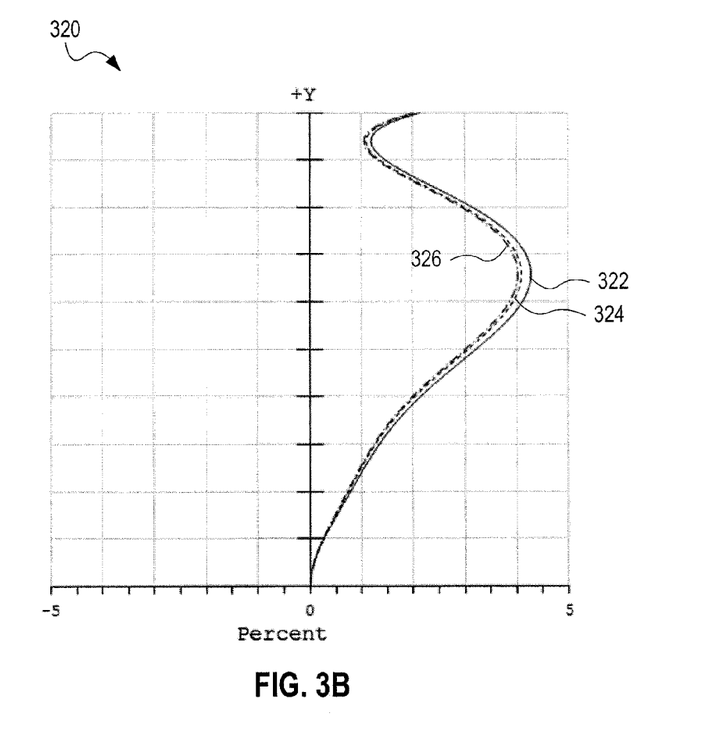
FIG. 3B is a plot of the f-theta distortion of the low-profile hybrid lens system of FIG. 2.

FIG. 3B is a plot of the f-theta distortion of low-profile hybrid lens system 200. FIG. 3B shows the f-theta distortion in percent, displayed on the horizontal axis, as a function of field angle, displayed on the vertical axis. The vertical axis extends from optical axis 260 to the most extreme location bounded by FOV angle 280. Thus, the maximum field angle plotted in FIG. 3B is $\theta_{max}$=40.110°. Distortion curve 322 (solid line) is computed at wavelength $\lambda_F$, distortion curve 324 (dashed line) is computed at wavelength $\lambda_D$, and distortion curve 326 (dash-dot line) is computed at wavelength $\lambda_F$.

Figure 3C:
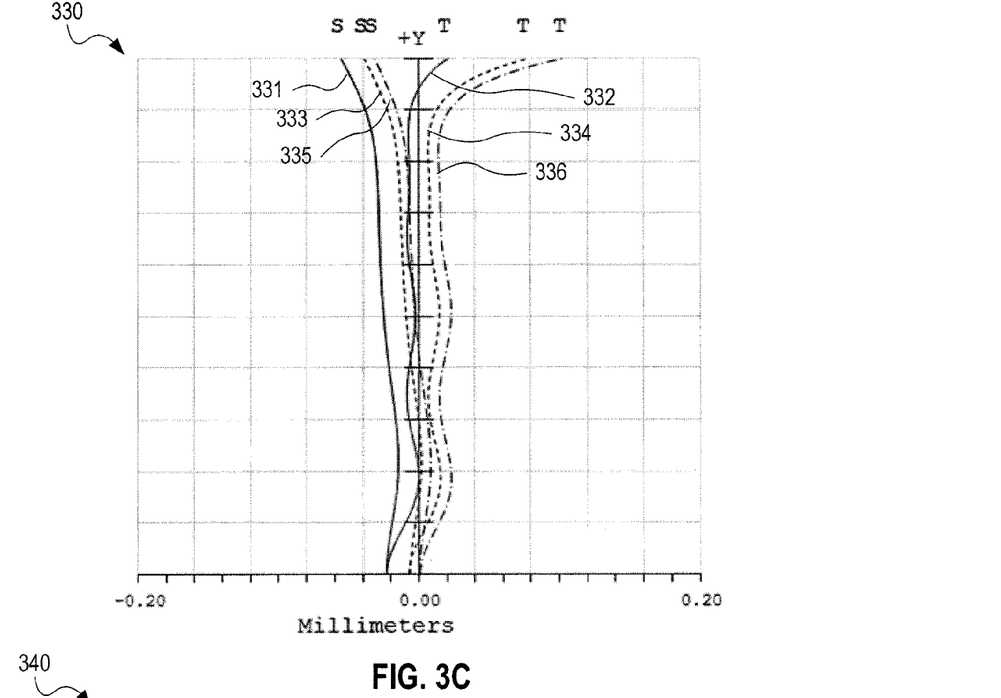
FIG. 3C is a plot of the Petzval field curvature of the low-profile hybrid lens system of FIG. 2.

FIG. 3C is a plot of the Petzval field curvature of low-profile hybrid lens system 200. The field curvature is plotted in millimeters, displayed on the horizontal axis, for field angles between zero and $\theta_{max}$=40.110°, displayed on the vertical axis. Field curvature 331 and field curvature 332 are computed at wavelength $\lambda_F$ in the sagittal and tangential planes, respectively. Field curvature 333 and field curvature 334 are computed at wavelength $\lambda_D$ in the sagittal and tangential planes, respectively. Field curvature 335 and field curvature 336 correspond to field curvature at wavelength $\lambda_C$ in the sagittal and tangential planes, respectively.

Figure 3D:
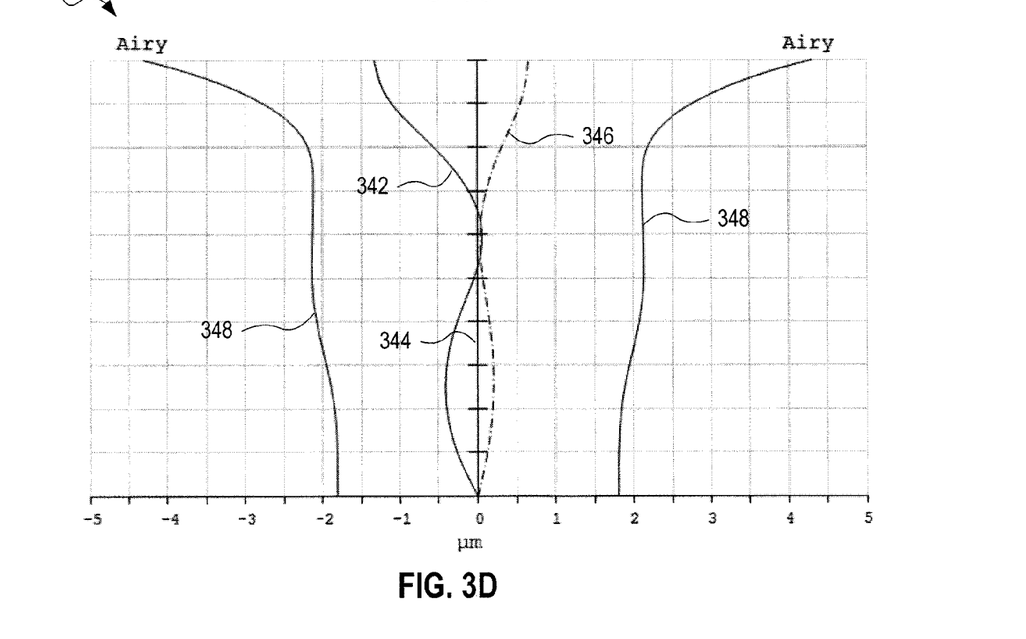
FIG. 3D is a plot of the lateral color error for the low-profile hybrid lens system of FIG. 2.

FIG. 3D is a plot of the lateral color error, also known as transverse chromatic aberration, for low-profile hybrid lens system 200. FIG. 3D shows the lateral color error in microns, displayed on the horizontal axis, as a function of field height, displayed on the vertical axis. The vertical axis extends from optical axis 260 to the most extreme radial distance from optical axis 260 associated with FOV angle 280. Field height ranges from $h_{min}$=0 (on-axis) to $h_{max}$=1.8140 mm. Lateral color is referenced to $\lambda_D$, such that the lateral color 344 for $\lambda_D$ is zero for all field heights. Lateral color 342 is computed at wavelength $\lambda_F$. Lateral color 346 is computed at wavelength $\lambda_C$. The lateral color error is less than the Airy disk radius 348 for the range of field heights evaluated.

Figure 4:
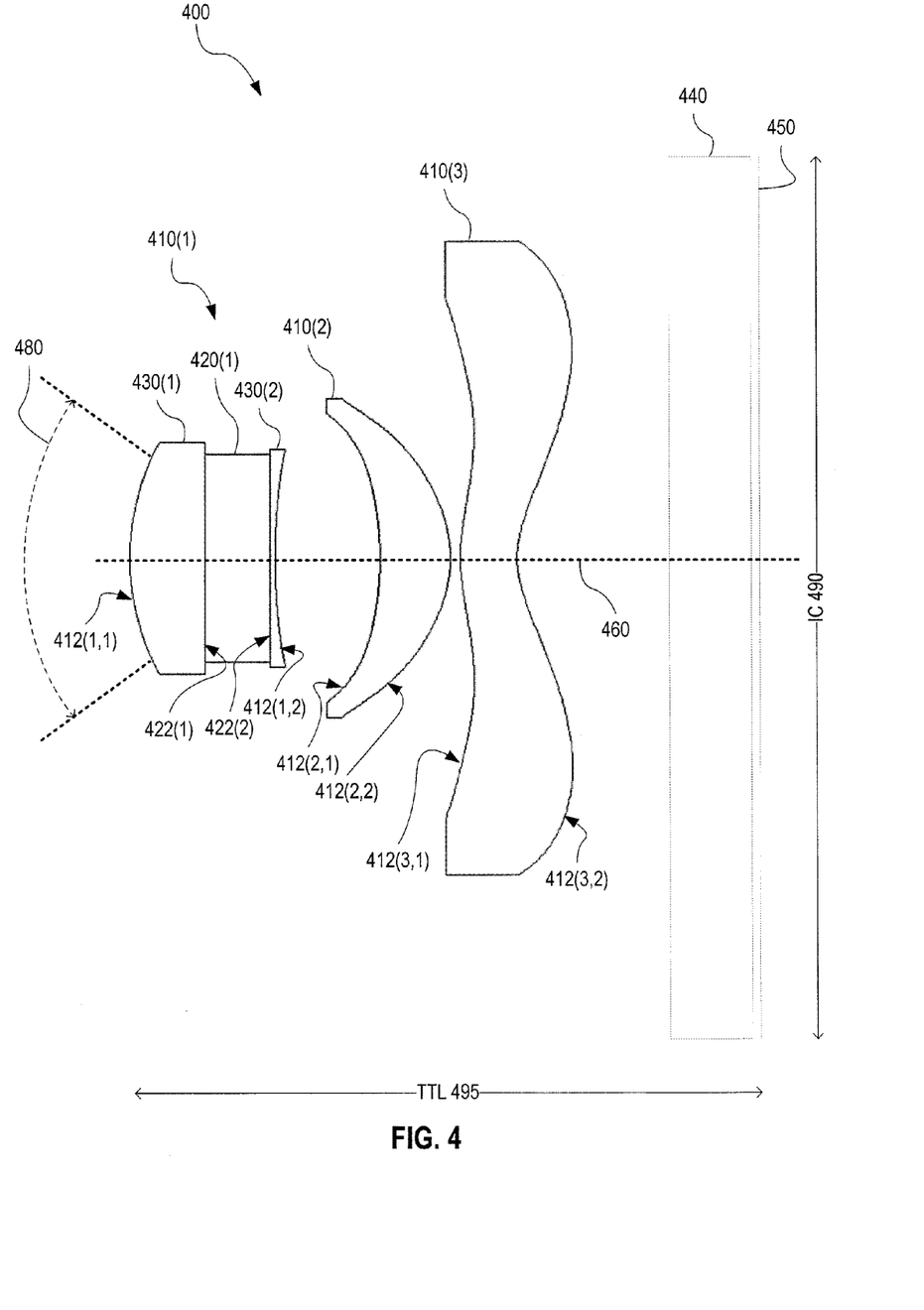
FIG. 4 illustrates another embodiment of the low-profile hybrid lens system of FIG. 1.

FIG. 4 illustrates one exemplary low-profile hybrid lens system 400 that includes a wafer-level lens 410(1), a cast lens 410(2), and a cast lens 410(3) optically coupled in series. Low-profile hybrid lens system 400 illustrates, by non-limiting example, the beneficial concepts discussed in connection with FIG. 1. While particular values of parameters for low-profile hybrid lens system 400 are disclosed, actual values may deviate from the disclosed values. A disclosed parameter value is a particular example of a range values and may be extended to such a range of values. Low-profile hybrid lens system 400 is an embodiment of low-profile hybrid lens system 120 and is similar to low-profile hybrid lens system 200 (FIG. 2). Wafer-level lens 410(1) is an embodiment of wafer-level lens 150. Cast lenses 410(2) and 410(3) are embodiments of cast lenses 160 and 170, respectively.

Low-profile hybrid lens system 400 is configured to image a scene onto an image plane 450 with a cover glass 440 placed between low-profile hybrid lens system 400 and image plane 450. Cover glass 440 is, for example, made of glass, plastic, or a combination thereof. Low-profile hybrid lens system 400 has a total track length 495 and forms an image circle 490 on image plane 450. Low-profile hybrid lens system 400 has a field of view (FOV) indicated by FOV angle 480. FIG. 4 further indicates the optical axis 460 of low-profile hybrid lens system 400.

Wafer-level lens 410(1) includes lens elements 430(1) and 430(2), and a substrate 420. Lens elements 430(1) and 430(2) are embodiments of lens elements 152 and 154, respectively. Substrate 420 is an embodiment of substrate 156. Substrate 420 has a substantially planar surface 422(1), facing away from image plane 450, and a substantially planar surface 422(2) facing toward image plane 450. Lens elements 430(1) and 430(2) are disposed on surfaces 422(1) and 422(2), respectively. Lens element 430(1) has a convex lens surface 412(1,1) facing away from image plane 450. Lens element 430(2) has a concave lens surface 412(1,2) facing toward image plane 450. Cast lens 410(2) has a concave lens surface 412(2,1) and a convex lens surface 412(2,2) respectively facing away from and toward image plane 450. Cast lens 410(3) has lens surfaces 412(3,1) and 412(3,2) respectively facing away from and toward image plane 450. Cast lens 410(3) is gull-wing shaped, and each of lens surfaces 412(3,1) and 412(3,2) include both convex and concave portions. All of lens surfaces 412 are aspheric.

Surface 422(1) defines an aperture stop of low-profile hybrid lens system 400. Without departing from the scope hereof, the diameter of substrate 420(1) may be larger than shown in FIG. 4, in which case an aperture may be formed on surface 422(1) to form the aperture stop. Also without departing from the scope hereof, lens elements 430(1) and 430(2), and cast lenses 410(2) and 410(3) may have larger diameters than illustrated in FIG. 4, although the optical performance presented below assumes optically active areas as illustrated in FIG. 4.

Convex lens surface 412(1,1) collects incident rays and directs those rays into low-profile hybrid lens system 400. The convex-planar shape of lens element 430(1) mitigates angles of rays entering low-profile hybrid lens system 400 and guides these rays through the stop aperture. Lens element 430(2) corrects chromatic aberration of low-profile hybrid lens system 400. Cast lens 410(2) directs the bundle of rays received from wafer-level lens 410(1) toward cast lens 410(3). Cast lens 410(2) is shaped to maintain, at least to a certain degree, the symmetry of each ray bundle respectively associated with a field location, such that the angular spread of a ray bundle before wafer-level lens 410(1) is similar to the angular spread of the corresponding ray bundle after cast lens 410(2). As a result, TTL 495 is shorter than what would be achieved with lens systems, wherein this symmetry is not maintained. Cast lens 410(3) primarily serves to (a) correct aberrations, especially distortion and astigmatism, and (b) direct the bundles of rays to image plane 450.

Tables 2A and 2B lists the lens data of low-profile hybrid lens system 400. The lens data includes values of design parameters for all lens surfaces 412, lens elements 430(1) and 430(2), substrate 420, and cast lenses 410(2) and 410(3). The lens data also includes the aperture stop (STO) location, configuration of cover glass (CG) 440, and a gap between cover glass 440 and image plane (IMA) 250. In addition, an assumed object location (OBJ) is listed. Material properties and thicknesses of each of lens elements 430(1) and 430(2), substrate 420, cast lenses 410(2) and 410(3), and cover glass 440 are indicated in Table 2A in the same row as the first surface of the respective element, as viewed from the object side. Material properties indicated in Table 2A are (a) the index of refraction $n_D$ at the Fraunhofer D-line $\lambda_D$=589.3, and (b) the Abbe number. Table 2B lists the aspheric coefficients of each lens surface 412.

Low-profile hybrid lens system 400 has a working F-number of 2.49, a FOV angle 480 of 80.5 degrees, TTL 495 of 2.815 mm, and IC 490 of 3.708 mm. It follows that IC/TTL=1.317 for low-profile hybrid lens system 400.

As evident from Table 2A, lens elements 430(1) and 430(2) are made from two different materials. The material of lens element 430(1) has index of refraction $n_D$=1.51 and Abbe number $V_d$=57.00, while lens element 430(2) has index of refraction $n_D$=1.59 and Abbe number $V_d$=31.24. The Abbe number of lens element 430(2) is smaller than both the Abbe number of lens element 430(1) and the Abbe number of cast lens 410(2).

The projected locations of lens surfaces 412(2,1) and 412(2,2) of cast lens 410(2) onto optical axis 460 overlap. As a result, it is impossible to produce cast lens 410(2) at the wafer-level (in a manner similar to wafer-level lens 410(1)) instead of by casting. The projected locations of lens surfaces 412(3,1) and 412(3,2) of cast lens 410(3) onto optical axis 460 are separated by about 200 microns. Hence, it would not be practical to produce cast lens 410(3) at the wafer-level instead of by casting, since the substrate of such a wafer-level lens would need to have thickness less than 200 microns.

The radii of curvature of lens surfaces 412 are such that (R2/R5)*R6<1.85 mm, and R5/R3/R2/R4/R1≥0.15 mm$^{-3}$, wherein R1, R2, R3, R4, R5, and R6 are the radii of curvature for lens surfaces 412(1,1), 412(1,2), 412(2,1), 412(2,2), 412(3,1), and 412(3,2), respectively.

TABLE 2A

| Surface | Radius of curvature [mm] | Thickness [mm] | $n_D$ | $V_d$ | Diameter [mm] |
|---|---|---|---|---|---|
| OBJ | Infinity | 400.000 | | | 674.417 |
| 412(1,1) | 1.109 | 0.349 | 1.51 | 57.00 | 1.071 |
| 422(1)/STO | Infinity | 0.305 | 1.52 | 62.60 | 0.758 |
| 422(2) | Infinity | 0.020 | 1.59 | 31.24 | 0.961 |
| 412(1,2) | 3.286 | 0.487 | | | 1.004 |
| 412(2,1) | −1.415 | 0.326 | 1.51 | 57.00 | 1.335 |
| 412(2,2) | −0.588 | 0.046 | | | 1.475 |
| 412(3,1) | 0.820 | 0.263 | 1.52 | 49.80 | 2.408 |
| 412(3,2) | 0.432 | 0.579 | | | 2.924 |
| CG | Infinity | 0.400 | 1.52 | 62.60 | 3.440 |
| Gap | Infinity | 0.040 | | | 3.671 |
| IMA 250 | Infinity | | | | 3.708 |

TABLE 2B

| | Aspheric coefficient | | | | | | |
|---|---|---|---|---|---|---|---|
| Surface | k | $A_4$ | $A_6$ | $A_8$ | $A_{10}$ | $A_{12}$ | $A_{14}$ |
| 412(1,1) | −0.0743 | −0.0545 | 0.5403 | −2.6651 | 7.3260 | −7.2797 | |
| 412(1,2) | 33.4740 | 0.0681 | −0.4742 | 0.9536 | −5.5423 | −1.0435 | |
| 412(2,1) | −34.4941 | −0.8259 | 1.5174 | −6.6082 | 8.4431 | 0.9534 | −9.0944 |
| 412(2,2) | −0.7359 | 0.5867 | −1.3201 | −0.1093 | 3.6357 | −15.2745 | 20.7242 |
| 412(3,1) | −16.6346 | −0.3586 | −0.0596 | 0.4059 | −0.2019 | −0.0213 | 0.0228 |
| 412(3,2) | −4.4668 | −0.3073 | 0.2520 | −0.1610 | 0.0480 | −0.0015 | −0.0017 |

FIGS. 5A, 5B, 5C, and 5D show the optical performance of low-profile hybrid lens system 400 (FIG. 4), as evaluated by the Zemax® Optical Design Program. FIGS. 5A, 5B, 5C, and 5D show spherical aberration, f-theta distortion, field curvature, and lateral color, respectively, of low-profile hybrid lens system 400, assuming location of object (OBJ) and image plane (IMA) 450 as indicated in Table 2A. As demonstrated by FIGS. 5A, 5B, 5C, and 5D, low-profile hybrid lens system 400 produces an image on image plane 450 of high optical quality.

Figure 5A:
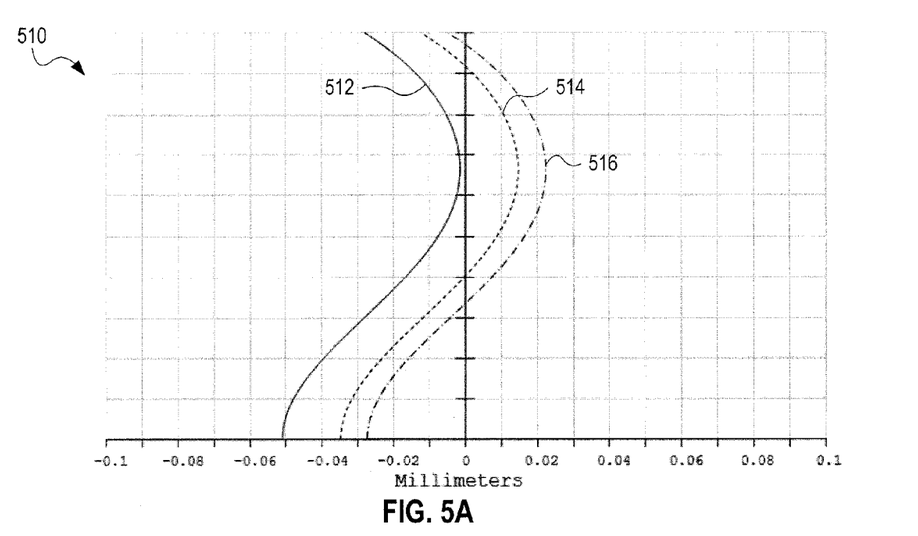
FIG. 5A is a plot of the longitudinal spherical aberration of the low-profile hybrid lens system of FIG. 4.

FIG. 5A is a plot of the longitudinal spherical aberration of low-profile hybrid lens system 400. FIG. 5A shows the longitudinal spherical aberration in millimeters, displayed on the horizontal axis, as a function of entrance pupil height, displayed on the vertical axis. The vertical axis extends from optical axis 460 to the most extreme radial distance from optical axis 460 associated with FOV angle 480. The maximum entrance pupil radius is $r_p$=0.4243 mm. Longitudinal spherical aberration curves 512, 514, and 516 are computed at the Fraunhofer F-, D- and C-lines, respectively.

Figure 5B:
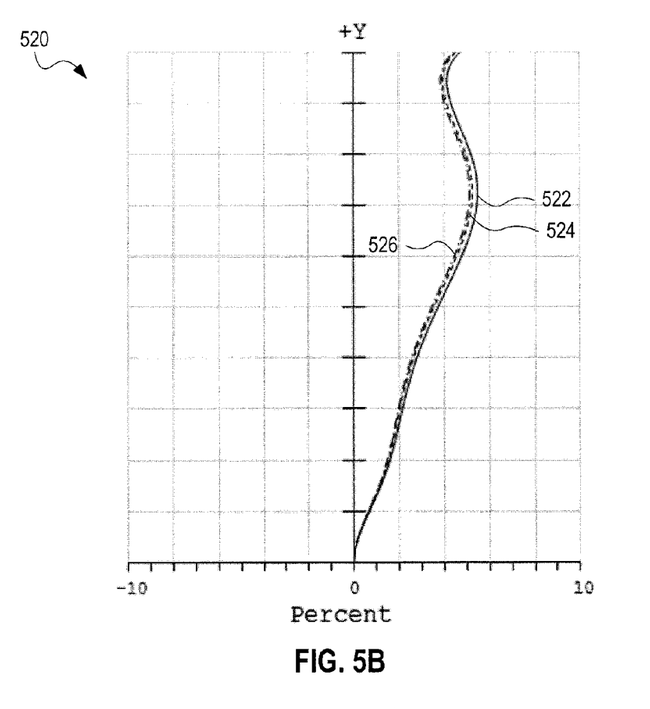
FIG. 5B is a plot of the f-theta distortion of the low-profile hybrid lens system of FIG. 4.

FIG. 5B is a plot of the f-theta distortion of low-profile hybrid lens system 400. FIG. 5B shows the f-theta distortion in percent, displayed on the horizontal axis, as a function of field angle, displayed on the vertical axis. The vertical axis extends from optical axis 460 to the most extreme location bounded by FOV angle 480. Thus, the maximum field angle plotted in FIG. 5B is $\theta_{max}$=40.268°. Distortion curve 522 (solid line) is computed at wavelength $\lambda_F$, distortion curve 524 (dashed line) is computed at wavelength $\lambda_D$, and distortion curve 526 (dash-dot line) is computed at wavelength $\lambda_F$.

Figure 5C:
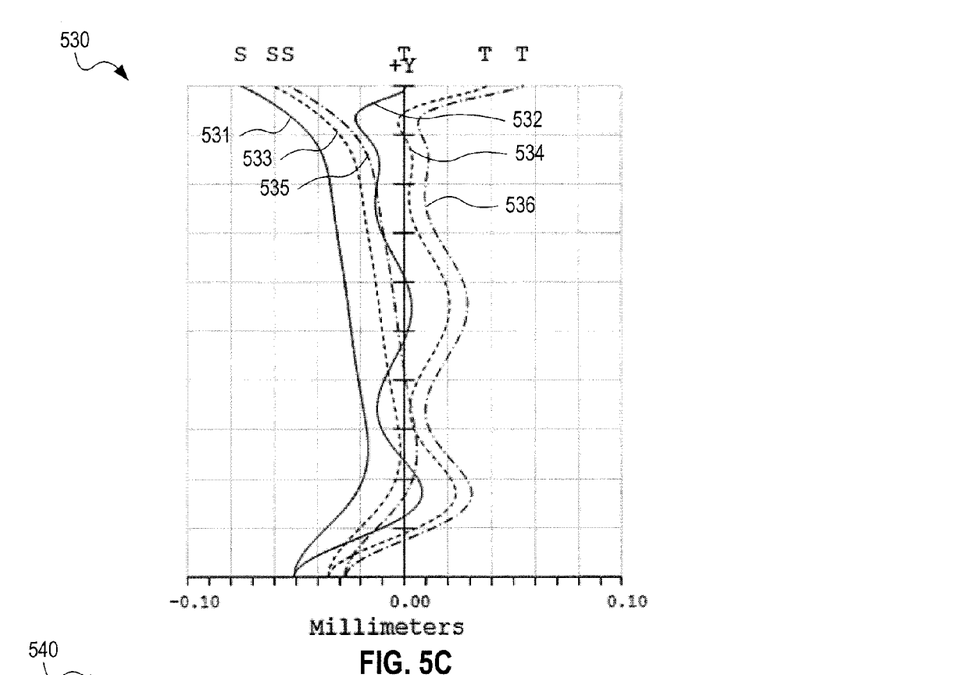
FIG. 5C is a plot of the Petzval field curvature of the low-profile hybrid lens system of FIG. 4.

FIG. 5C is a plot of the Petzval field curvature of low-profile hybrid lens system 400. The field curvature is plotted in millimeters, displayed on the horizontal axis, for field angles between zero and $\theta_{max}$=40.268°, displayed on the vertical axis. Field curvature 531 and field curvature 532 are computed at wavelength $\lambda_F$ in the sagittal and tangential planes, respectively. Field curvature 533 and field curvature 534 are computed at wavelength $\lambda_D$ in the sagittal and tangential planes, respectively. Field curvature 535 and field curvature 536 correspond to field curvature at wavelength $\lambda_C$ in the sagittal and tangential planes, respectively.

Figure 5D:
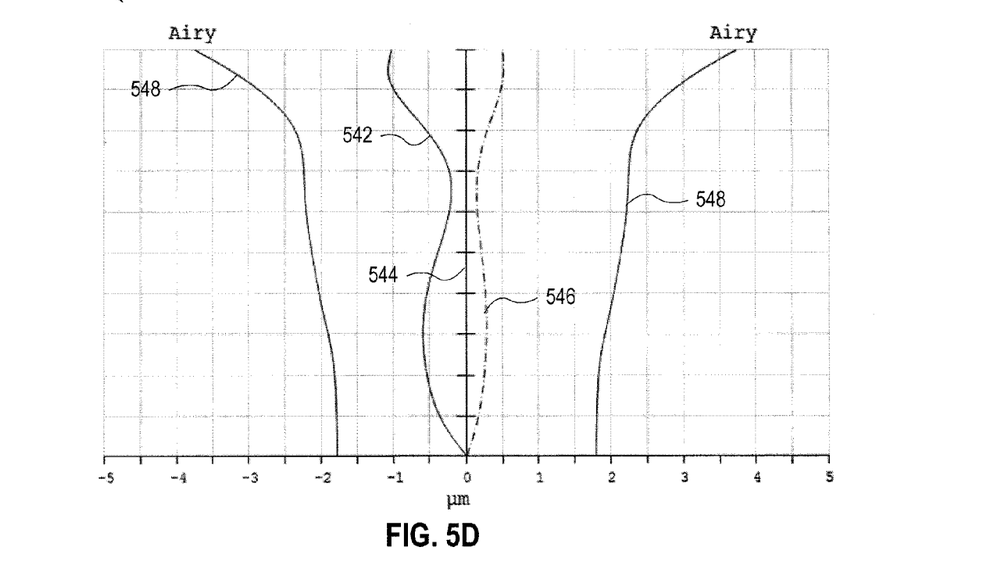
FIG. 5D is a plot of the lateral color error for the low-profile hybrid lens system of FIG. 4.

FIG. 5D is a plot of the lateral color error for low-profile hybrid lens system 400. FIG. 5D shows the lateral color error in microns, displayed on the horizontal axis, as a function of field height, displayed on the vertical axis. The vertical axis extends from optical axis 460 to the most extreme radial distance from optical axis 460 associated with FOV angle 480. Field height ranges from $h_{min}$=0 (on-axis) to $h_{max}$=1.8140 mm. Lateral color is referenced to $\lambda_D$, such that the lateral color 544 for $\lambda_D$ is zero for all field heights. Lateral color 542 is computed at wavelength $\lambda_F$. Lateral color 546 is computed at wavelength $\lambda_C$. The lateral color error is less than the Airy disk radius 548 for the range of field heights evaluated.

Figure 6:
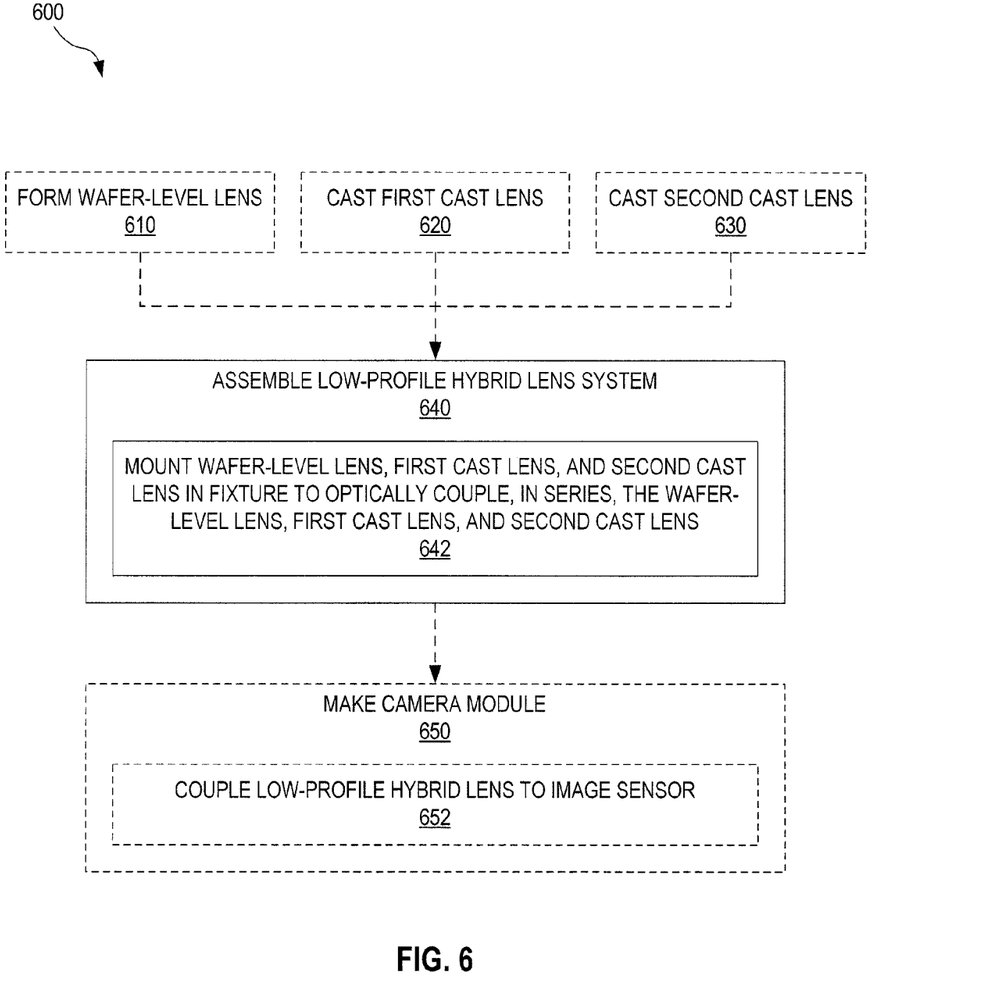
FIG. 6 illustrates a method for manufacturing a low-profile hybrid lens system, according to an embodiment.

FIG. 6 illustrates one exemplary method 600 for manufacturing low-profile hybrid lens system 120 (FIG. 1). Method 600 may be used to form low-profile hybrid lens system 120 according to the lens specification of low-profile hybrid lens system 200 (FIG. 2) or according to the lens specification of low-profile hybrid lens system 400 (FIG. 4).

In a step 640, method 600 assembles low-profile hybrid lens system 120. Step 640 includes a step 642, wherein wafer-level lens 150, cast lens 160, and cast lens 170 are mounted in a fixture. The fixture is configured to place wafer-level lens 150, cast lens 160, and cast lens 170 optically in series, as illustrated in FIG. 1. In one example, step 642 utilizes methods known in the art to mount wafer-level lens 150, cast lens 160, and cast lens 170 in the fixture.

Optionally, step 640 is preceded by steps 610, 620, and 630. In step 610, method 600 forms wafer-level lens 150. In step 620, method 600 casts cast lens 160. In step 630, method 600 casts cast lens 170.

In an embodiment, method 600 further includes a step 650 of making camera module 110 based upon low-profile hybrid lens system 120. Step 650 includes a step 652 of coupling low-profile hybrid lens system 120 to image sensor 130 to form camera module 110. In one example, the fixture of step 642 is configured for mounting onto an electronic circuit board that includes image sensor 130.

Figure 7:
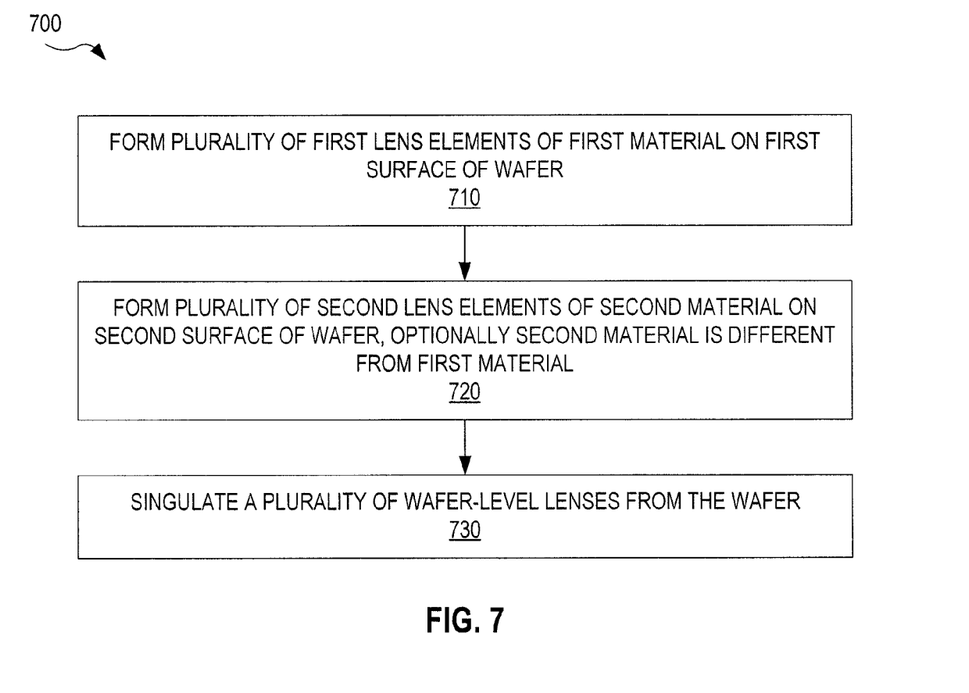
FIG. 7 illustrates a method for forming a plurality of wafer-level lenses, according to an embodiment.

FIG. 7 illustrates one exemplary method 700 for forming a plurality of wafer-level lenses 150 (FIG. 1). Step 610 of method 600 (FIG. 6) may implement method 700.

In a step 710, a plurality of lens elements 152 are formed on a first surface of a wafer made of the material associated with substrate 156. In one embodiment of step 710, the plurality of lens elements are molded on the first surface of the wafer. For example, a resin (such as a polymer resin) is deposited onto the first surface of the wafer; a mold with a plurality of recesses, each of shape complimentary to lens surface 153, is placed on the first surface (with the resin), the resin is cured, and the mold is removed from the first surface. The resin may be an ultraviolet (UV) curable epoxy that is cured by shining UV light through the wafer to the resin on the first surface.

In a step 720, a plurality of lens elements 154 are formed on a second surface of the wafer of step 710, wherein the second surface is opposite the first surface. Step 720 may utilize the same method as step 710, however using a mold with a plurality of recesses, each of which have shape complimentary to lens surface 155 and are positioned at the same locations of the wafer as one of the recesses of the mold used in step 710.

In a step 730, a plurality of wafer-level lenses 150 are singulated from the wafer. The wafer is diced, for example using methods known in the art, to form the plurality of wafer-level lenses 150.

Figure 8:
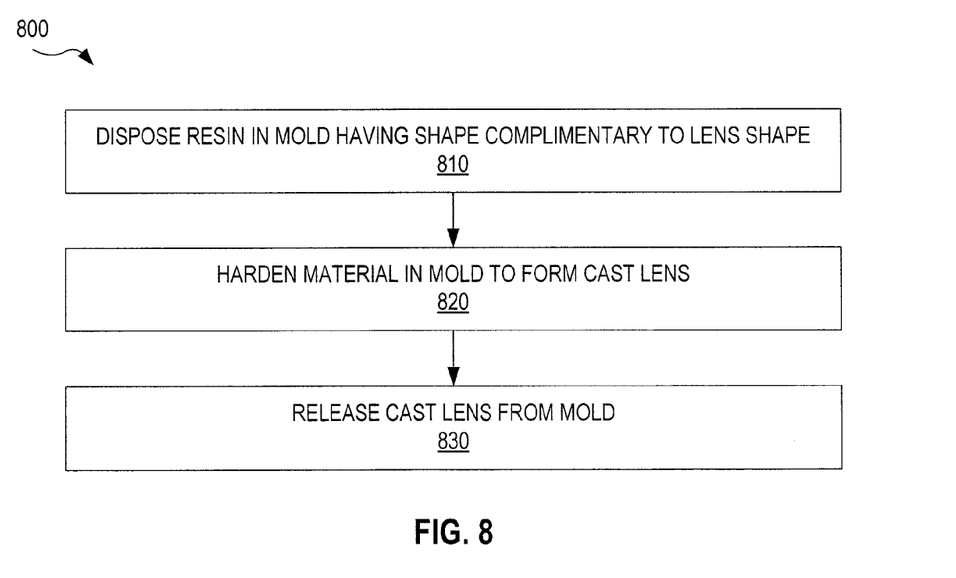
FIG. 8 illustrates a method for producing a cast lenses, according to an embodiment.

FIG. 8 illustrates one exemplary method 800 for producing either one of cast lenses 160 and 170 (FIG. 1). One or both of steps 620 and 630 of method 600 (FIG. 6) may implement method 800.

In a step 810, a resin (such as a polymer resin) is disposed in a mold that has shape complimentary to the shape of the cast lens, i.e., one of cast lenses 160 and 170.

In a step 820, the resin is hardened. In one example, the resin is an UV curable epoxy, and step 820 includes exposing the resin to UV light. Step 820 results in the formation of the cast lens inside the mold.

In a step 830, the mold is opened to release the cast lens therefrom.

Combinations of Features

Features described above as well as those claimed below may be combined in various ways without departing from the scope hereof. For example, it will be appreciated that aspects of one low-profile hybrid lens system or method for manufacturing the same described herein may incorporate or swap features of another low-profile hybrid lens system or method for manufacturing the same described herein. The following examples illustrate some possible, non-limiting combinations of embodiments described above. It should be clear that many other changes and modifications may be made to the methods and device herein without departing from the spirit and scope of this invention:

(A1) A low-profile hybrid lens system for imaging a scene onto an image plane, may include (a) a wafer-level lens with (i) a planar substrate having opposing first and second surfaces, (ii) a first lens element of a first material and disposed on the first surface, and (iii) a second lens element of a second material and disposed on the second surface, (b) a first cast lens, and (c) a second cast lens.

(A2) In the low-profile hybrid lens system denoted as (A1), the wafer-level lens, the first cast lens, and the second cast lens may be optically coupled in series.

(A3) In either of the low-profile hybrid lens systems denoted as (A1) and (A2), each of the first and second cast lenses may be composed of the same material throughout.

(A4) In either of the low-profile hybrid lens systems denoted as (A1) and (A2), each of the first and second cast lenses may be composed of a single bulk material and one or more surface coatings.

(A5) In any of the low-profile hybrid lens systems denoted as (A1) through (A4), the wafer-level lens, the first cast lens, and the second cast lens may cooperate to image the scene onto the image plane.

(A6) In any of the low-profile hybrid lens systems denoted as (A1) through (A5), each of the first and second cast lenses may be closer than the wafer-level lens to the image plane.

(A7) In the low-profile hybrid lens system denoted as (A6), the wafer-level lens may be furthest from the image plane, the second cast lens may be closest to the image plane, the first cast lens may be located between the wafer-level lens and the second cast lens along an optical axis of the low-profile hybrid lens system.

(A8) The low-profile hybrid lens system denoted as (A7) may have image circle (IC) and total track length (TTL) such that IC/TTL>1.275.

(A9) Either of the low-profile hybrid lens systems denoted as (A7) and (A8) may have TTL<3 millimeters.

(A10) Any of the low-profile hybrid lens systems denoted as (A7) through (A9) may have field of view angle greater than 75°.

(A11) Any of the low-profile hybrid lens systems denoted as (A7) through (A10) may have working F-number less than three.

(A12) In any of the low-profile hybrid lens systems denoted as (A7) through (A11), the first lens element of the wafer-level lens may have Abbe number greater than Abbe number of the second lens element of the wafer-level lens.

(A13) In any of the low-profile hybrid lens systems denoted as (A7) through (A12), the first cast lens may have Abbe number greater than Abbe number of the second lens element of the wafer-level lens.

(A14) In any of the low-profile hybrid lens systems denoted as (A7) through (A13), the second lens element of the wafer-level lens may include a second lens surface facing away from the substrate and facing toward the image plane, wherein the second lens surface has radius of curvature $R2$; and the second cast lens may include (a) a fifth lens surface facing away from the image plane and having radius of curvature $R5$, and (b) a sixth lens surface facing toward the image plane and having radius of curvature $R6$; wherein $R2/R5*R6<1.85$ millimeters.

(A15) In any of the low-profile hybrid lens systems denoted as (A7) through (A14), the first lens element of the wafer-level lens may include a first lens surface facing away from the substrate and facing away from the image plane, wherein the first lens surface has radius of curvature $R1$; the second lens element of the wafer-level lens may include a second lens surface facing away from the substrate and facing toward the image plane, wherein the second lens surface has radius of curvature $R2$; the first cast lens may include (a) a third lens surface facing away from the image plane and having radius of curvature $R3$, and (b) a fourth lens surface facing toward the image plane and having radius of curvature $R4$; and the second cast lens may include a fifth lens surface facing away from the image plane and having radius of curvature $R5$; wherein $R5/R3/R2/R4/R1<0.15$ millimeters$^{-3}$.

(A16) In any of the low-profile hybrid lens systems denoted as (A7) through (A15), the first lens element of the wafer-level lens may include a convex lens surface facing away from the substrate and facing away from the image plane; the second lens element of the wafer-level lens may include a concave lens surface facing away from the substrate and facing toward the image plane; and the first cast lens may include (a) a concave cast lens surface facing away from the image plane, and (b) a convex cast lens surface facing toward the image plane.

(A17) In the low-profile hybrid lens system denoted as (A16), location, along the optical axis, of the concave cast lens surface may overlap with location, along the optical axis, of the convex cast lens surface.

(A18) In any of the low-profile hybrid lens systems denoted as (A1) through (A17), each of the first cast lens and the second cast lens may include (a) a first lens surface facing away from the image plane and having a first location along optical axis of the low-profile hybrid lens system, and (b) a second lens surface facing toward the image plane and having a second location along the optical axis, wherein the second location is offset from the first location by less than 0.3 millimeters.

(A19) In any of the low-profile hybrid lens systems denoted as (A1) through (A17), each of the first cast lens and the second cast lens may include (a) a first lens surface facing away from the image plane and having a first location along optical axis of the low-profile hybrid lens, and (b) a second lens surface facing toward the image plane and having a second location along the optical axis, wherein the second location is offset from the first location by less than 0.1 millimeters.

(B1) A method for manufacturing a low-profile hybrid lens system may include mounting a wafer-level lens, a first cast lens, and a second cast lens in a fixture to optically couple, in series, the wafer-level lens and the first and second cast lenses, wherein the wafer-level lens has (a) a planar substrate with opposing first and second surfaces, (b) a first lens element of a first material and disposed on the first surface, and (c) a second lens element of a second material and disposed on the second surface.

(B2) The method denoted as (B1) may further include disposing a first plurality of copies of the first lens element on a first surface of a wafer, and disposing a second plurality of copies of the second lens element on a second surface of the wafer, the second surface of the wafer being opposite the first surface.

(B3) The method denoted as (B2) may further include singulating, after the step of disposing the first plurality and after the step of disposing the second plurality, a plurality of copies of the wafer-level lens from the wafer.

(B4) Any of the methods denoted as (B1) through (B3) may further include disposing a first material in a first mold and hardening the first material, while in the first mold, to form the first cast lens.

(B5) Any of the methods denoted as (B1) through (B4) may further include disposing a second material in a second mold and hardening the second material, while in the second mold, to form the second cast lens.

(B6) Any of the methods denoted as (B1) through (B5) may be used to manufacture any of the low-profile hybrid lens systems denoted as (A1) through (A19).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A low-profile hybrid lens system for imaging a scene onto an image plane, comprising:
   a wafer-level lens including
      a planar substrate having opposing first and second surfaces,
      a first lens element of a first material and disposed on the first surface, and
      a second lens element of a second material and disposed on the second surface;
   a first cast lens; and
   a second cast lens;
   wherein the wafer-level lens, the first cast lens, and the second cast lens are optically coupled in series.

2. The low-profile hybrid lens system of claim 1, each of the first and second cast lenses being composed of same material throughout.

3. The low-profile hybrid lens system of claim 1, each of the first and second cast lenses being composed of a single bulk material and one or more surface coatings.

4. The low-profile hybrid lens system of claim 1, the wafer-level lens, the first cast lens, and the second cast lens cooperating to image the scene onto the image plane.

5. The low-profile hybrid lens system of claim 4, each of the first and second cast lenses being closer than the wafer-level lens to the image plane.

6. The low-profile hybrid lens system of claim 1, the wafer-level lens being furthest from the image plane, the second cast lens being closest to the image plane, the first cast lens being located between the wafer-level lens and the second cast lens along an optical axis of the low-profile hybrid lens system.

7. The low-profile hybrid lens system of claim 6, having image circle (IC) and total track length (TTL) such that IC/TTL>1.275.

8. The low-profile hybrid lens system of claim 7, having TTL<3 millimeters.

9. The low-profile hybrid lens system of claim 7, having field of view angle greater than 75°.

10. The low-profile hybrid lens system of claim 7, having working F-number less than three.

11. The low-profile hybrid lens system of claim 6,
   the first lens element of the wafer-level lens having Abbe number greater than Abbe number of the second lens element of the wafer-level lens; and
   the first cast lens having Abbe number greater than Abbe number of the second lens element of the wafer-level lens.

12. The low-profile hybrid lens system of claim 6,
   the second lens element of the wafer-level lens including a second lens surface facing away from the substrate and facing toward the image plane, the second lens surface having radius of curvature R2; and
   the second cast lens including:
      a fifth lens surface facing away from the image plane and having radius of curvature R5, and
      a sixth lens surface facing toward the image plane and having radius of curvature R6;
   wherein R2/R5*R6<1.85 millimeters.

13. The low-profile hybrid lens system of claim 6,
   the first lens element of the wafer-level lens including a first lens surface facing away from the substrate and facing away from the image plane, the first lens surface having radius of curvature R1;
   the second lens element of the wafer-level lens including a second lens surface facing away from the substrate and facing toward the image plane, the second lens surface having radius of curvature R2;
   the first cast lens including:
      a third lens surface facing away from the image plane and having radius of curvature R3, and
      a fourth lens surface facing toward the image plane and having radius of curvature R4; and
   the second cast lens including a fifth lens surface facing away from the image plane and having radius of curvature R5,
   wherein R5/R3/R2/R4/R1<0.15 millimeters$^{-3}$.

14. The low-profile hybrid lens system of claim 6,
the first lens element of the wafer-level lens including a convex lens surface facing away from the substrate and facing away from the image plane;
the second lens element of the wafer-level lens including a concave lens surface facing away from the substrate and facing toward the image plane; and
the first cast lens including:
a concave cast lens surface facing away from the image plane, and
a convex cast lens surface facing toward the image plane.

15. The low-profile hybrid lens system of claim 14, location, along the optical axis, of the concave cast lens surface overlapping with location, along the optical axis, of the convex cast lens surface.

16. The low-profile hybrid lens system of claim 1, each of the first cast lens and the second cast lens including:
a first lens surface facing away from the image plane and having a first location along optical axis of the low-profile hybrid lens system; and
a second lens surface facing toward the image plane and having a second location along the optical axis, the second location being offset from the first location by less than 0.3 millimeters.

17. The low-profile hybrid lens system of claim 1, each of the first cast lens and the second cast lens including:
a first lens surface facing away from the image plane and having a first location along optical axis of the low-profile hybrid lens; and
a second lens surface facing toward the image plane and having a second location along the optical axis, the second location being offset from the first location by less than 0.1 millimeters.

18. A method for manufacturing a low-profile hybrid lens system, comprising mounting a wafer-level lens, a first cast lens, and a second cast lens in a fixture to optically couple, in series, the wafer-level lens and the first and second cast lenses, the wafer-level lens including:
a planar substrate having opposing first and second surfaces;
a first lens element of a first material and disposed on the first surface; and
a second lens element of a second material and disposed on the second surface.

19. The method of claim 18, further comprising:
disposing a first plurality of copies of the first lens element on a first surface of a wafer;
disposing a second plurality of copies of the second lens element on a second surface of the wafer, the second surface of the wafer being opposite the first surface; and
singulating, after the step of disposing the first plurality and after the step of disposing the second plurality, a plurality of copies of the wafer-level lens from the wafer.

20. The method of claim 18, further comprising:
disposing a first material in a first mold;
hardening the first material, while in the first mold, to form the first cast lens;
disposing a second material in a second mold; and
hardening the second material, while in the second mold, to form the second cast lens.

* * * * *